US007873826B2

(12) United States Patent
Cho et al.

(10) Patent No.: US 7,873,826 B2
(45) Date of Patent: Jan. 18, 2011

(54) ROUTING VOICE OVER INTERNET (VOIP) CALL

(75) Inventors: Soung-Su Cho, Yongin-si (KR); Dae-Hyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1231 days.

(21) Appl. No.: 11/296,537

(22) Filed: Dec. 8, 2005

(65) Prior Publication Data

US 2006/0136716 A1   Jun. 22, 2006

(30) Foreign Application Priority Data

Dec. 16, 2004 (KR) .................. 10-2004-0107439

(51) Int. Cl.
*H04L 29/06* (2006.01)
*H04N 7/167* (2006.01)
*H03J 7/32* (2006.01)
*H04B 1/00* (2006.01)

(52) U.S. Cl. .................. 713/153; 380/223; 455/59; 455/146; 455/511

(58) Field of Classification Search .................. 713/153; 380/255, 223; 455/59, 146, 511
See application file for complete search history.

(56) References Cited

U.S. PATENT DOCUMENTS

| 7,460,671 B1 * | 12/2008 | Rossello et al. | 380/275 |
| 2004/0208122 A1 | 10/2004 | McDysan | |
| 2004/0258003 A1 * | 12/2004 | Kokot et al. | 370/254 |
| 2006/0064579 A1 * | 3/2006 | Aaron et al. | 713/150 |
| 2006/0098625 A1 * | 5/2006 | King et al. | 370/352 |

FOREIGN PATENT DOCUMENTS

| EP | 0 702 477 | 3/1996 |
| GB | 2 397 967 | 8/2004 |
| WO | WO 98/57465 | 12/1998 |
| WO | WO 2004/075509 | 9/2004 |

OTHER PUBLICATIONS

United Kingdom Office Action of the United Kingdom Patent Application No. GB0523966.0, mailed on Mar. 27, 2006.

* cited by examiner

*Primary Examiner*—Nasser Moazzami
*Assistant Examiner*—Mohammad W Reza
(74) *Attorney, Agent, or Firm*—H.C. Park & Associates, PLC

(57) ABSTRACT

A method and system to rout a Voice over Internet Protocol (VoIP) call based on a service class of a subscriber enables efficient utilization of bandwidth by providing service corresponding to the subscriber service class, while enabling use of a Virtual Private Network (VPN) which provides security to a VoIP service. The method includes: determining a service class of a subscriber upon packet data being received from the subscriber; determining whether the received current packet is packet data to be routed over an encrypted network or a non-encrypted network, based on the service class of the subscriber; encrypting the received packet data with an encryption processor and then routing the encrypted packet data to a final destination with a router upon a determination that the received packet data is to be routed over the encrypted network; and directly routing the received packet data to the final destination with the router without encrypting the received packet data upon a determination that the received packet data is to be routed over the non-encrypted network without being encrypted.

9 Claims, 6 Drawing Sheets

FIG. 5

| Access Code | Digit Length | Delete Length | REMOTE IP TABLE |
|---|---|---|---|
| 02 | 2 | 2 | 1 |
| 031 | 3 | 3 | 2 |
| 042 | 3 | 3 | 3 |

FIG. 6A

| REMOTE IP TABLE 1 ||
|---|---|
| PUBLIC NETWORK REMOTE G/W | VPN REMOTE G/W |
| 165.213.89.10 | 10.215.10.10 |
| – | – |

FIG. 6B

| REMOTE IP TABLE 2 ||
|---|---|
| PUBLIC NETWORK REMOTE G/W | VPN REMOTE G/W |
| 168.219.105.10 | 192.168.10.10 |
| – | – |

FIG. 6C

| REMOTE IP TABLE 3 ||
|---|---|
| PUBLIC NETWORK REMOTE G/W | VPN REMOTE G/W |
| 65.30.87.10 | 176.128.0.10 |
| 65.30.87.11 | 176.128.0.11 |
| – | – |

ROUTING VOICE OVER INTERNET (VOIP) CALL

CLAIM OF PRIORITY

This application makes reference to, incorporates the same herein, and claims all benefits accruing under 35 U.S.C. §119 from an application for Method and System for Routing VoIP Call Based on Subscriber Service Class, filed in the Korean Intellectual Property Office on 16 Dec. 2004 and there duly assigned Serial No. 2004-107439.

BACKGROUND OF THE INVENTION

1. Field of the Invention

The present invention relates to a method and system for routing a Voice over Internet Protocol (VoIP) call. More particularly, the present invention relates to a method and system for routing a Voice over Internet Protocol (VoIP) call based on a service class of a subscriber, capable of providing a differentiated service according to the subscriber class when a Virtual Private Network (VPN) is used for security of an Internet phone service using VoIP.

2. Description of the Related Art

A technique of transferring voice information using Internet protocol (IP) in a packet switch network used as a data network is called voice over Internet protocol (VoIP). VoIP is not a traditional line-based protocol like a public switched telephone network (PSTN) and transfers voice information in a digital format within discrete packets.

In general, a public network is used in providing a telephony service using VoIP, and therefore security is an important issue.

As one way to provide security, a virtual private network (VPN) is emerging. The VPN is built into an IP network which is provided by a communication company. The VPN is a closed private circuit network that is virtually built within the public network and that is protected by, for example, authentication and encryption technologies.

In the VPN, however, data encryption takes a processing time in encoding/decoding, and a high overhead of packets for encryption and authentication arises.

As such, in the conventional VoIP service, the VPN is used since use of the public network causes a security issue, but the VPN also encounters a difficulty in obtaining a bandwidth.

SUMMARY OF THE INVENTION

It is an object of the present invention to enable efficient utilization of bandwidth by providing differentiated service according to a service class of a subscriber, when using a Virtual Private Network (VPN) providing security for a Voice over Internet Protocol (VoIP) service.

According to one aspect of the present invention, a method of routing a Voice over Internet Protocol (VoIP) call is provided, the method comprising: determining a service class of a subscriber upon packet data being received from the subscriber; determining whether the received current packet is packet data to be routed over an encrypted network or a non-encrypted network, based on the service class of the subscriber; encrypting the received packet data with an encryption processor and then routing the encrypted packet data to a final destination with a router upon a determination that the received packet data is to be routed over the encrypted network; and directly routing the received packet data to the final destination with the router without encrypting the received packet data upon a determination that the received packet data is to be routed over the non-encrypted network without being encrypted.

Routing the received packet data to the final destination preferably comprises selecting a gateway corresponding to an access code in a destination telephone number to be the final destination.

The method preferably further comprises registering service types of subscribers in a service system prior to determining the service class of the subscriber.

The method preferably further comprises storing service classes corresponding to the service types of the subscribers in a subscriber information table in a database of the service system upon respective subscribers registering their service types in the service system.

The subscriber service class is preferably different for signaling data and voice packet data.

The subscriber service class is preferably different for use of the non-encrypted network and use of the encrypted network.

The subscriber service class is preferably classified into: a class in which the encrypted network is available for both the signaling data and the voice packet data; a class in which the encrypted network is available for the signaling data and the non-encrypted network is available for the voice packet data; a class in which the non-encrypted network is available for the signaling data and the encrypted network is available for the voice packet data; and a class in which the non-encrypted network is available for both the signaling data and the voice packet data.

The subscriber service class is preferably adjusted in response to the type of service of the subscriber being changed.

Encrypting the received packet data with an encryption processor and routing the encrypted packet data to a final destination with a router upon the received packet data being routed over the encrypted network preferably comprises routing the packet data to a gateway corresponding to the non-encrypted network upon there being no destination gateway that performs encryption processing.

According to another aspect of the present invention, a system for routing a Voice over Internet Protocol (VoIP) call is provided, the system comprising: a switching system including: a router adapted to provide an entire function related to call routing and to parse information of data related to a call and to provide a path to a router according to the parsed information, the router being adapted to provide a relevant network service; a subscriber information table adapted to store information about service classes of subscribers; and an encryption processor adapted to perform encryption for subscriber service classes stored in the subscriber information table requiring encryption; and a VoIP terminal adapted to communicate with the switching system, the VoIP terminal adapted to be provided with a VoIP call service over a network available in the subscriber service class corresponding to the type of service selected by the subscriber.

The switching system preferably further comprises: a controller adapted to manage call connection information and an entire function related to voice media processing; a subscriber information table adapted to store service classes of VoIP subscribers and other information therein; an input unit adapted to receive voice media data and signaling data, the voice media data containing information indicating whether encryption is to be applied; an encryption processor adapted to encrypt received packet data upon a determination that the received packet data is to be encrypted, based on the information in the received data indicating whether encryption is to be applied; and a router adapted to rout the packet transferred via the input unit or the packet encrypted by the encryption processor to a final destination address by referring to a routing table.

The system preferably further comprises: a Network Address Translation (NAT) table adapted to provide address translation to an address of a local network to allow communication with an address of a global network; and a parser adapted to parse a header of the signaling data to translate a destination global address of the packet, and to register the changed content with the address translation table, prior to establishing a communication path with the final destination.

The system preferably further comprises: a Network Address Port Translation (NAPT) table adapted to provide address translation to an address of a local network to allow communication with an address of a global network; and a parser adapted to parse a header of the signaling data to translate a destination global address and port information for the packet and to register the changed content in the address port translation table, prior to establishing a communication path to a final destination.

The switching system preferably comprises: a caller server adapted to manage functions of a controller and the subscriber information table; and a data server having an input unit, the encryption processor and the router adapted to transfer packets.

The subscriber information table is preferably adapted to store types of service selected by respective subscribers.

The subscribers preferably register their types of service in the service system such that classes corresponding to the respective types of service are stored.

The assigned subscriber service class is preferably different for signaling data and voice packet data.

The assigned subscriber service class is preferably different for use of the non-encrypted network and use of the encrypted network.

The service class of the subscriber is preferably classified into: a class in which the encrypted network is available for both the signaling data and the voice packet data; a class in which the encrypted network is available for the signaling data and the non-encrypted network is available for the voice packet data; a class in which the non-encrypted network is available for the signaling data and the encrypted network is available for the voice packet data; and a class in which the non-encrypted network is available for both the signaling data and the voice packet data.

The subscriber service class is preferably adjusted in accordance with the type of service of the subscriber being changed.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein:

FIG. 5 is a table of typical destination address information; and

FIGS. 6A, 6B and 6C are tables of information for a gateway at a destination address.

DETAILED DESCRIPTION OF THE INVENTION

The present invention will now be described more fully with reference to the accompanying drawings, in which exemplary embodiments of the present invention are shown. The present invention can, however, be embodied in different forms and should not be construed as being limited to the embodiments set forth herein. Rather, these embodiments are provided so that this disclosure will be thorough and complete, and will fully convey the scope of the present invention to those skilled in the art.

A type of switching system applied to the present invention is described below prior to discussing the configuration of the present invention.

The switching system can be configured in such a manner that a function of a call server and a function of a data server are integrally incorporated or separated at different places.

The integral switching system and the separated switching system have the following difference.

In the integral switching system, a data transmission and reception process is straightforward and rapid since an internal bus is utilized to communicate data between the call server and the data server.

In the separated switching system, it is necessary to match protocols between the call server and the data server and perform a separate data transmission and reception process to communicate data between the call server and the data server.

A configuration of the present invention having the functionally separated call server and the data server will be described by way of example.

Figure 1:
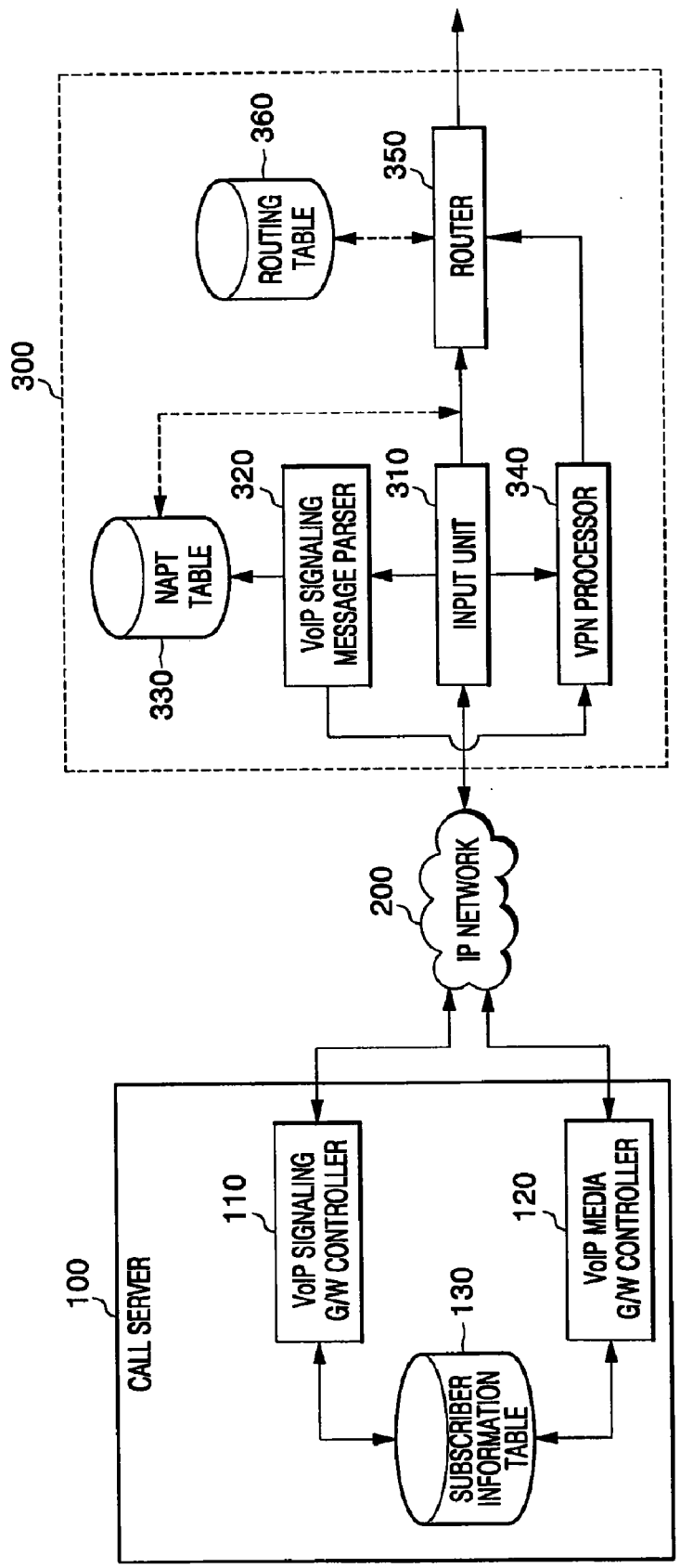
FIG. 1 is a block diagram of a configuration for routing a VoIP call in an environment 11 where address translation is performed using an Network Address Port Translation (NAPT) mechanism according to an embodiment of the present invention.

FIG. 1 is a block diagram of a configuration for routing a VoIP call in an environment where address translation is performed using a Network Address Port Translation (NAPT) mechanism according to an embodiment of the present invention;

First, the inventive configuration with NAPT is described with reference to FIG. 1. NAPT is a network address translation method by which several hosts in a local network are able to share an IP address to simultaneously communicate with a global network.

A switching system of the present invention includes a call server 100 and a data server 300.

Data transmission and reception between the call server 100 and the data server 300 is performed over an IP network 200.

The call server 100 includes a VoIP signaling gateway (G/W) controller 110 for performing voice switching and signal processing and subscriber terminal management, a VoIP media G/W controller 120 for translating voice to data and transmitting and receiving the data over the IP network, and a subscriber information table 130 for storing VoIP subscriber service classes and other information.

The subscriber information table 130 can be located within the server or in a separate location for an efficient network configuration.

The data server 300 includes an input unit 310, a VoIP signaling message parser 320, a Network Address Port Translation (NAPT) table 330, a routing table 360, a router 350, and a VPN processor 340.

The input unit 310 receives packet data over the IP network 200 and determines whether to route the packet data over the VPN or the public network.

The input unit 310 also checks an IP address in the packet and simultaneously checks whether to effect a port translation, and then delivers the packet to the router.

When port translation is needed, the input unit 310 performs the port translation and IP address translation using the information stored in the NAPT table 330, and then forwards the relevant packet to the router 350.

The router 350 checks a destination address of a VPN packet transferred from the VPN processor 340, and then routes the VPN packet to the destination. The router 350 routes the VPN packet by referring to the routing table 360 before a communication path for a VPN based voice packet is established, and routes the VPN packet based on the information stored in the NAPT table 330 after the communication path for the VPN based voice packet has been established.

The VoIP signaling message parser 320 parses a header of the packet data and registers the detected information with the NAPT table 330. If the packet data is parsed to be a packet which should be encapsulated through the VPN, the VoIP signaling message parser 320 sends information to the VPN processor 340 that is needed for the VPN processor 340 to VPN-process the received current packet.

The NAPT table 330 stores the information for performing NAPT.

A mechanism by which the address translation is performed in communication equipment includes basic Network Address Translation (basic NAT) with a 1:1 binding of a local IP address and a global IP address, and Network Address Port Translation (NAPT) which supports N:1 binding with port translation in a TCP/UDP layer.

In the NAPT mechanism, address use efficiency is excellent since a data flow is discriminated through the port translation, but bidirectional communication is not supported.

Figure 2:
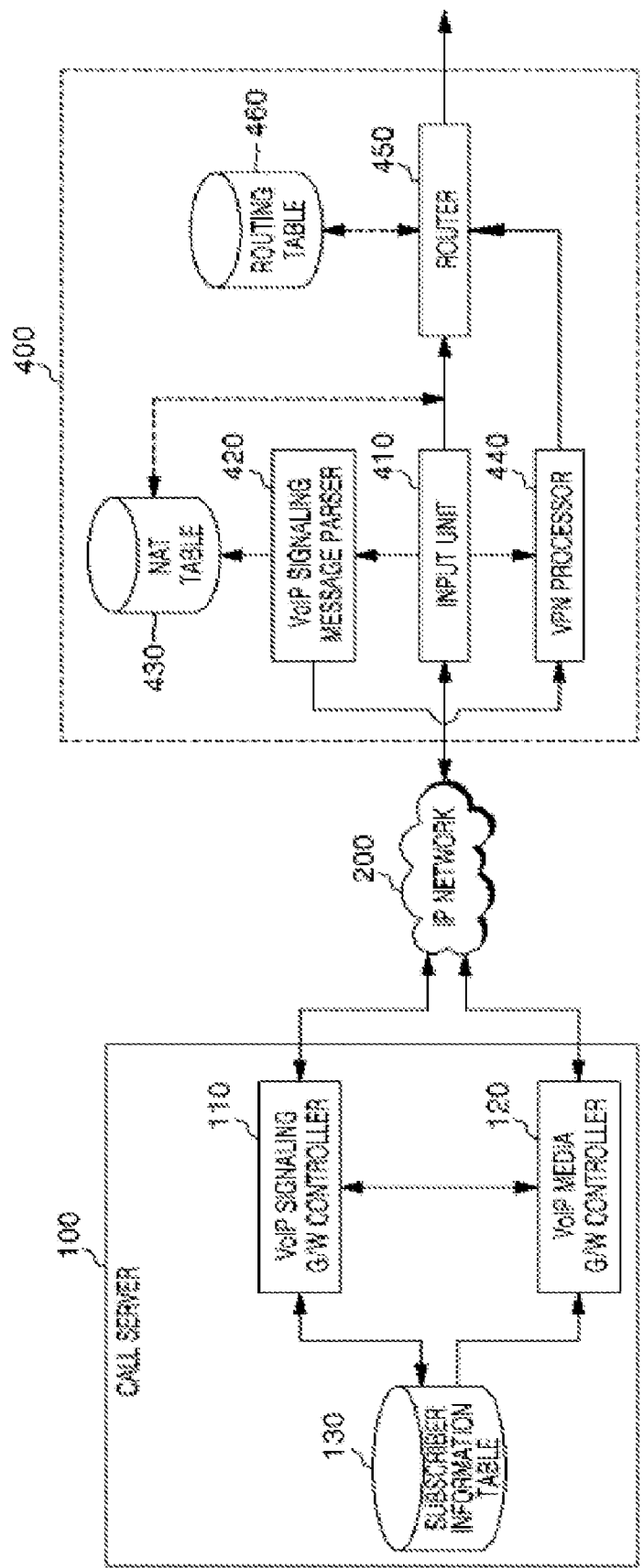
FIG. 2 is a block diagram of a configuration for routing a VoIP call in an environment where address translation is performed using an Network Address Translation (NAT) mechanism according to an embodiment of the present invention.

FIG. 2 is a block diagram of a configuration for routing a VoIP call in an environment where address translation is performed using an NAT mechanism according to an embodiment of the present invention.

Referring to FIG. 2, a switching system of the present invention includes a call server 100 and a data server 400.

Data transmission and reception between the call server 100 and the data server 400 is effected over an IP network 200.

The call server 100 includes a VoIP signaling gateway (G/W) controller 110 for performing voice switching and signal processing and subscriber terminal management, a VoIP media G/W controller 120 for translating voice to data and transmitting and receiving the data over the IP network, and a subscriber information table 130 for storing service classes of VoIP subscribers and other information.

The subscriber information table 130 can be placed within the server or in a separate location for an efficient network configuration.

The data server 400 includes an input unit 410, a VoIP signaling message parser 420, a network address translation table (NAT) 430, a routing table 460, a router 450, and a VPN processor 440.

The input unit 410 receives packet data over the IP network 200 and determines whether to route the packet data over the VPN or the public network.

The input unit 410 also checks an IP address in the packet, performs IP address translation using the information registered in the NAT table 430, and forwards the packet to the router 450.

The router 450 checks a destination address of a VPN packet transferred from the VPN processor 440, and then routes the VPN packet to the destination. The router 450 routes the VPN packet by referring to the routing table 460 before a communication path for a VPN based voice packet has been established, and routes the VPN packet based on the information stored in the NAT table 430 after the communication path for the VPN based voice packet has been established.

The VoIP signaling message parser 420 parses a header of the packet data and registers the detected information in the NAT table 430. If the packet data is parsed to be a packet which should be encapsulated through the VPN, the VoIP signaling message parser 420 sends information to the VPN processor 440 that is needed for the VPN processor 440 to VPN-process the received current packet.

The NAT table 430 stores information for performing NAT.

In the NAT mechanism, address translation is straightforward and rapid because it is accomplished on only the IP layer, and bidirectional communication is supported by using a DNS Application Level Gateway (ALG).

An operation in which subscriber service levels are classified to implement the present invention is described below.

Figure 3:
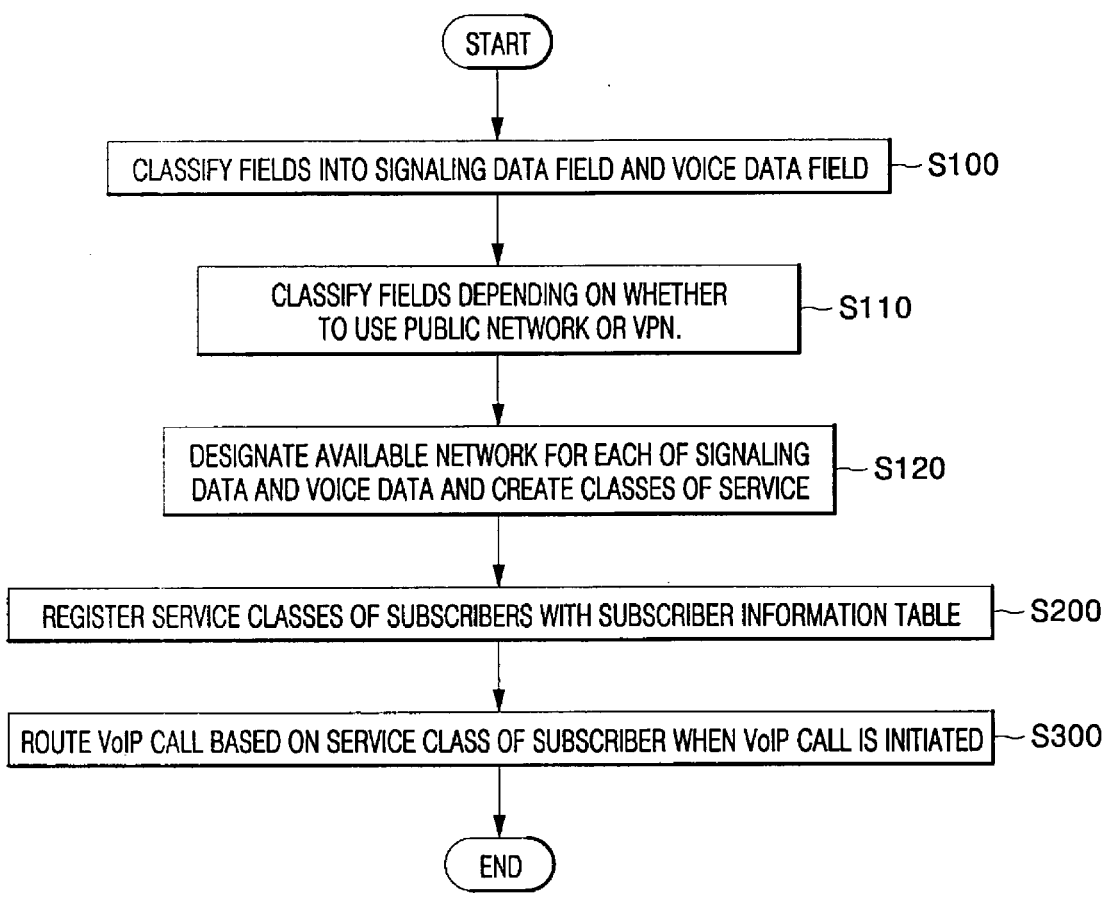
FIG. 3 is a flowchart of a method of classifying subscriber service levels according to an embodiment of the present invention.

FIG. 3 is a flowchart of a method of classifying subscriber service levels in accordance with an embodiment of the present invention.

Referring to FIG. 3, first, in order to build a subscriber service class criterion, a table has fields including a signaling data field and a voice data field (S100).

For the signaling data field and the voice data field, the table has a field to indicate whether to use the public network or to perform VPN processing (S110).

Classes of service can be created by designating an available network for each of the signaling data and the voice data (S120), as shown in Table 1:

TABLE 1

| No. | Signaling | Voice | Note |
| --- | --- | --- | --- |
| 0 | 1 | 1 | Signaling-VPN, Voice-VPN |
| 1 | 1 | 0 | Signaling-VPN, Voice-Public network |
| 2 | 0 | 1 | Signaling-Public network, Voice-VPN |
| 3 | 0 | 0 | Signaling-Public network, Voice-Public network |

The service classes of respective subscribers are registered in the subscriber information table 130 after the classes of service have been created as in Table 1 (S200).

When the registration procedure has been completed and a VoIP call is initiated by a subscriber, the VoIP call is routed based on the service class of the subscriber registered in the subscriber information table 130 (S300).

A method associated with the service class subscription in S300 is discussed in detail below with reference to FIG. 4.

Figure 4:
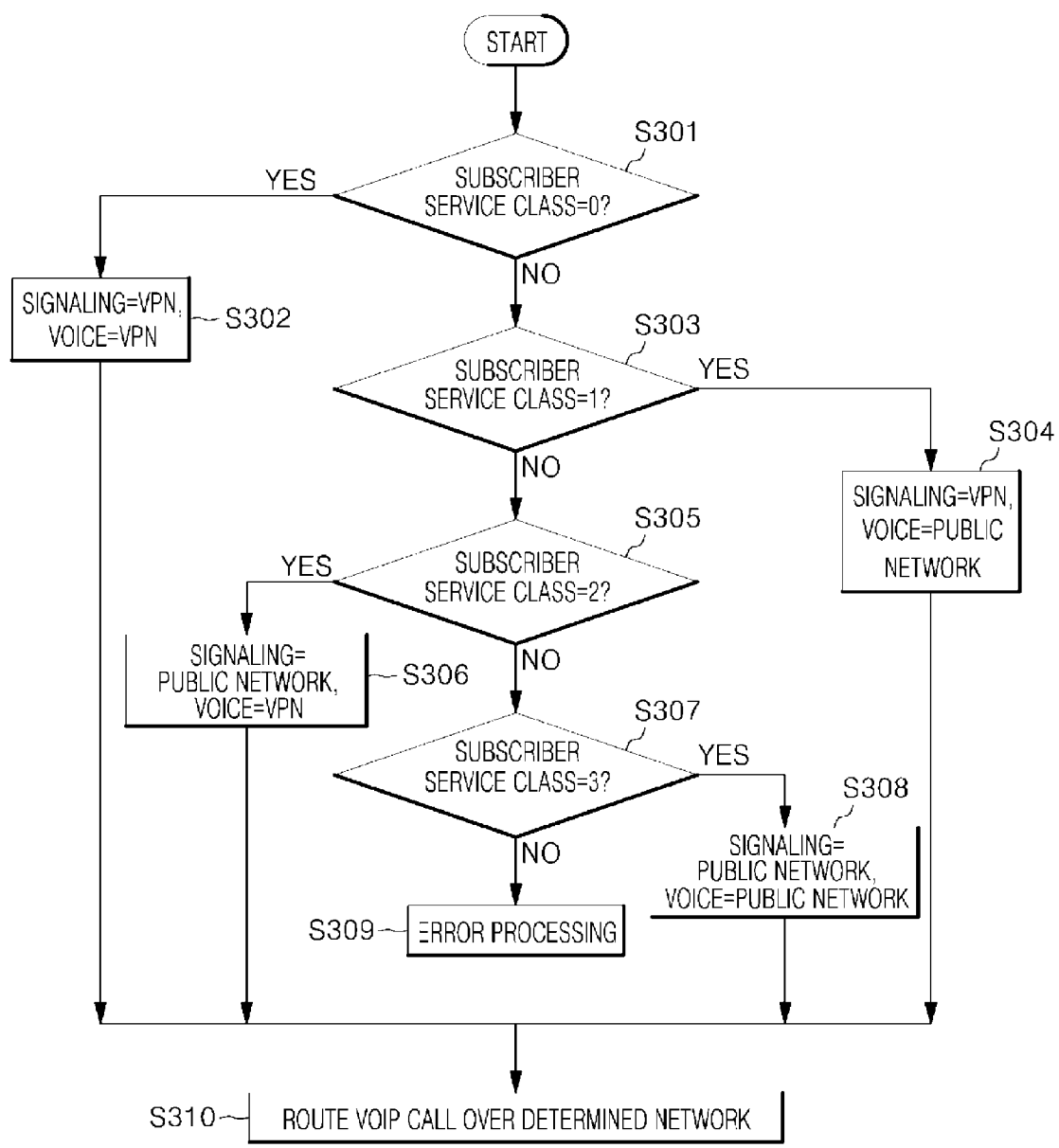
FIG. 4 is a flowchart of the routing of a call according to the service class of each subscriber of FIG. 3.

FIG. 4 is a flowchart of routing a call according to subscriber service class of the method of FIG. 3.

When a VoIP call is initiated by a subscriber, a determination is made, based on the service class of the subscriber, whether to perform the VPN processing or to use the typical public network.

If the subscriber service class is determined in S301 to be '0', the subscriber is able to transmit packets over the VPN upon signaling and even upon voice packet transmission (S302).

If the subscriber service class is determined in S301 not to be '0', a determination is made as to whether the subscriber service class is '1' (S303).

If the subscriber service class is determined in S303 to be '1', the subscriber is able to transmit packets over the VPN upon signaling and over the typical public network upon voice packet transmission (S304).

If the subscriber service class is determined in S303 not to be '1', a determination is made as to whether the subscriber service class is '2' (S305).

If the subscriber service class is determined in S305 to be '2', the subscriber is able to transmit packets over the typical public network upon signaling and over the VPN upon voice packet transmission (S306).

When the subscriber service class is determined in S305 not to be '2', a determination is made as to whether the subscriber service class is '3' (S307).

When the subscriber service class is determined in S307 to be '3', the subscriber is able to transmit packets over the typical public network upon signaling and voice packet transmission (S308).

When the subscriber service class is determined in S307 not to be '3', determination cannot be made as to what the subscriber service class is, and therefore this case is regarded as an error (S309).

When a network over which the packet is transmitted is determined in S302, S304, S306 and S308, the packet is forwarded to the router 350.

In order to route the packet to a destination, the destination is determined based on an access code in a dialing number.

While the address of the destination is determined based on the access code, a gateway is selected corresponding to the subscriber service class.

In order to determine the destination based on the dialing number, it is necessary to discover the router through indexing a remote IP table of the routing table 360.

FIG. 5 is a table of typical destination address information.

Referring to FIG. 5, the remote IP table for the destination gateway is determined according to access code. The remote IP table can be organized in the form shown in FIGS. 6A, 6B and 6C.

FIGS. 6A, 6B and 6C are tables of information for a gateway at a destination address.

By referring to the number of the remote IP table of FIG. 5, remote IP tables of FIGS. 6A, 6B and 6C corresponding to the number are indexed, and one of the public network remote G/W and the VPN remote G/W specified in the corresponding remote IP table is selected corresponding to the service class of the subscriber.

When VPN service is disabled due to a failure of the destination gateway during service, it is necessary to temporarily route packet data to a gateway corresponding to a typical public network, even though the service class of the subscriber is a VPN-usable class.

It will be apparent to those of skill in the art that various modifications can be made to the embodiments of the present invention described herein without departing from the spirit and scope of the present invention. Therefore, the true legal scope of the present invention should not be construed as being limited by the illustrated embodiments but should be determined solely by the appended claims.

As described above, according to the present invention, by initiating a VoIP call, a VoIP service subscriber receives service corresponding to his/her service class, which allows the subscriber to choose a desired quality of service.

Furthermore, a service provider is capable of providing a service over a variety of paths, e.g., the public network and the VPN, which enables efficient utilization of bandwidth.

What is claimed is:

1. A system for routing a Voice over Internet Protocol (VoIP) call, the system comprising:

a switching system comprising:

a controller configured to manage call connection information and voice media processing;

a subscriber information table configured to store service classes of VoIP subscribers;

an input unit configured to receive voice media data and signaling data;

an encryption processor configured to encrypt received packet data, which is designated as a subscriber service class, in response to a determination that the received packet data is to be encrypted, based on the service class of VoIP subscriber stored in the subscriber information table; and a router configured to rout a packet transferred via the input unit or via the encryption processor to a final destination address by referring to a routing table; and a VoIP terminal configured to communicate with the switching system, the VoIP terminal configured to be provided with a VoIP call service over a network according to the service class of VoIP subscriber, wherein the service class of VoIP subscriber comprises a service class in which signaling data and voice packet data are transmitted using different networks.

2. The system of claim 1, further comprising:

a Network Address Translation (NAT) table configured to provide address translation to an address of a local network to allow communication with an address of a global network; and a parser configured to parse a header of the signaling data, to translate a destination global address of the packet, and to register changed content with the network address translation table, prior to establishing a communication path with a final destination.

3. The system of claim 1, further comprising:

a Network Address Port Translation (NAPT) table configured to provide address translation to an address of a local network to allow communication with an address of a global network; and a parser configured to parse a header of the signaling data, to translate a destination global address and port information of the packet, and to register changed content in the network address port translation table, prior to establishing a communication path to a final destination.

4. The system of claim 1, wherein the switching system comprises:
- a caller server configured to manage the controller and the subscriber information table; and
- a data server comprising the input unit, and
- wherein the encryption processor and the router are configured to transfer packets.

5. The system of claim 1, wherein the subscriber information table is configured to store types of service selected by respective subscribers.

6. The system of claim 5, wherein types of service are registered in the service system such that classes corresponding to the respective types of service are stored.

7. The system of claim 1, wherein the different networks comprise a non-encrypted network and an encrypted network.

8. The system of claim 1, wherein the subscriber service classes comprise:
- a class in which the encrypted network is available for both the signaling data and the voice packet data;
- a class in which the encrypted network is available for the signaling data and the non-encrypted network is available for the voice packet data;
- a class in which the non-encrypted network is available for the signaling data and the encrypted network is available for the voice packet data; and
- a class in which the non-encrypted network is available for both the signaling data and the voice packet data.

9. The system of claim 8, wherein a selected service class is adjusted in accordance with a type of service being changed.

* * * * *